US012637363B2

(12) United States Patent
Huang et al.

(10) Patent No.: US 12,637,363 B2
(45) Date of Patent: May 26, 2026

(54) CATHODE MATERIAL AND PREPARATION METHOD THEREOF AND SECONDARY LITHIUM BATTERY

(71) Applicants: BTR Nano Tech Co., Ltd., Shenzhen (CN); Panasonic Energy Co., Ltd., Osaka (JP)

(72) Inventors: Youyuan Huang, Shenzhen (CN); Shunyi Yang, Shenzhen (CN); Xiong Song, Shenzhen (CN); Hongxu Zhang, Shenzhen (CN); Liang Luo, Shenzhen (CN); Shun Nomura, Osaka (JP); Koki Morita, Osaka (JP); Takuya Shinomiya, Osaka (JP)

(73) Assignees: BTR Nano Tech Co., Ltd., Shenzhen (CN); Panasonic Energy Co., Ltd., Osaka (JP)

( * ) Notice: Subject to any disclaimer, the term of this patent is extended or adjusted under 35 U.S.C. 154(b) by 655 days.

(21) Appl. No.: 17/442,520

(22) PCT Filed: Mar. 24, 2021

(86) PCT No.: PCT/CN2021/082711
§ 371 (c)(1),
(2) Date: Sep. 23, 2021

(87) PCT Pub. No.: WO2021/190559
PCT Pub. Date: Sep. 30, 2021

(65) Prior Publication Data
US 2022/0250938 A1      Aug. 11, 2022

(30) Foreign Application Priority Data

Mar. 27, 2020    (CN) ......................... 202010229098.3

(51) Int. Cl.
*C01G 53/50* (2025.01)
*H01M 10/0525* (2010.01)

(52) U.S. Cl.
CPC ........ *C01G 53/50* (2013.01); *H01M 10/0525* (2013.01); *C01P 2004/61* (2013.01); *C01P 2006/12* (2013.01); *C01P 2006/40* (2013.01)

(58) Field of Classification Search
CPC .. C01G 53/50; C01P 2004/61; C01P 2006/12; C01P 2006/40; H01M 10/0525
See application file for complete search history.

(56) References Cited

U.S. PATENT DOCUMENTS

| | | |
|---|---|---|
| 2012/0168696 A1 | 7/2012 | Huang |
| 2016/0260965 A1 | 9/2016 | Wu |

(Continued)

FOREIGN PATENT DOCUMENTS

| | | |
|---|---|---|
| CN | 101308925 A | 11/2008 |
| CN | 102832389 A | 12/2012 |

(Continued)

OTHER PUBLICATIONS

Denning et al., Sparkling Water and the Carbon Cycle, Jul. 2017, Colorado State University—Climates of the Past and Future 2017 (Year: 2017).*

(Continued)

*Primary Examiner* — Ula C Ruddock
*Assistant Examiner* — Olivia Mason Ruggiero
(74) *Attorney, Agent, or Firm* — Tucker Ellis LLP

(57) ABSTRACT

Provided is a cathode material, a preparation method thereof, and a secondary lithium battery. The cathode material is characterized in that a chemical formula of the cathode material is $Li_bNi_{1-x-y}Co_xAl_yM_zO_2$, where $0.95 \leq b \leq 1.10$, $0 \leq x \leq 0.15$, $0.01 \leq y \leq 0.1$, $0 < z \leq 0.05$, and an M element is a metal element; the M element is distributed in interior and (Continued)

sintering a mixture containing at least one of $Ni_{1-x-y}Co_xAl_y$ oxide or hydroxide, an M compound and a lithium compound to obtain a sintered product, where $0 \leq x \leq 0.15$, $0.01 \leq y \leq 0.1$, and an M element is a metal element                                        ⌇ S100 subjecting the sintered product to washing with a solvent and drying to obtain the cathode material with a chemical formula $Li_bNi_{1-x-y}Co_xAl_yM_zO_2$, where $0.95 \leq b \leq 1.10$, $0 \leq x \leq 0.15$, $0.01 \leq y \leq 0.1$, and $0 < z \leq 0.05$; the M element is distributed in interior and surface of the cathode material, the M element distributed in the interior of the cathode material is presented in a doped form, and the M element distributed in the surface of the cathode material is presented in a form of a coating layer formed of at least one of M oxide or lithium-M composite oxide; and a molar ratio of the M element in the interior to the M element in the surface is greater than 0.5.                                        ⌇ S200 surface of the cathode material, the M element distributed in the interior of the cathode material is presented in a doped form, and the M element distributed in the surface of the cathode material is presented in a form of a coating layer formed of at least one of M oxide or lithium-M composite oxide; and a molar ratio of the M element in the interior to the M element in the surface is greater than 0.5. The cathode material provided has good high-rate capability and thermal stability.

9 Claims, 3 Drawing Sheets

(56) References Cited

U.S. PATENT DOCUMENTS

| | | | |
|---|---|---|---|
| 2016/0351898 A1 * | 12/2016 | Fang | H01M 4/5825 |
| 2017/0077496 A1 | 3/2017 | Liu | |
| 2017/0155146 A1 | 6/2017 | Lee | |
| 2017/0207443 A1 * | 7/2017 | Shen | H01M 4/0404 |
| 2018/0006302 A1 | 1/2018 | Li | |
| 2018/0287135 A1 * | 10/2018 | Shin | H01M 4/525 |
| 2019/0115596 A1 | 4/2019 | Kajiyama | |
| 2019/0148711 A1 * | 5/2019 | Jo | H01M 10/052 429/231.95 |
| 2019/0198872 A1 * | 6/2019 | Saruwatari | H01M 4/36 |
| 2020/0350555 A1 | 11/2020 | Park | |
| 2020/0381719 A1 | 12/2020 | Park | |

FOREIGN PATENT DOCUMENTS

| | | | | | |
|---|---|---|---|---|---|
| CN | 105140492 | A | 12/2015 | | |
| CN | 106505193 | A | 3/2017 | | |
| CN | 108023077 | A | 5/2018 | | |
| CN | 108140821 | A | 6/2018 | | |
| CN | 108232182 | A | 6/2018 | | |
| CN | 108493435 | A | 9/2018 | | |
| CN | 109301207 | A | 2/2019 | | |
| CN | 109546101 | A | 3/2019 | | |
| CN | 109713251 | A | 5/2019 | | |
| CN | 109920996 | A | 6/2019 | | |
| CN | 110054226 | A | 7/2019 | | |
| JP | 2010211925 | A | 9/2010 | | |
| JP | 2011070789 | A | 4/2011 | | |
| JP | 2016197611 | A | 11/2016 | | |
| JP | 2018503238 | A | 2/2018 | | |
| KR | 10-2014-0081663 | A | 7/2014 | | |
| KR | 20180043077 | A * | 4/2018 | ........ | H01M 10/0525 |
| WO | 2019021806 | A1 | 1/2019 | | |
| WO | WO-2019083221 | A1 * | 5/2019 | ............ | C01G 53/00 |
| WO | WO-2019087558 | A1 * | 5/2019 | ............ | C01G 53/00 |
| WO | 2019143047 | A1 | 7/2019 | | |
| WO | WO-2019168035 | A1 * | 9/2019 | | |
| WO | WO-2019179219 | A1 * | 9/2019 | ............ | C01G 53/42 |

OTHER PUBLICATIONS

International Search Report from corresponding International Application No. PCT/CN2021/082711, mailed Jun. 28, 2021.

Office Action from corresponding Chinese Application No. 202110312836.5, dated Jan. 18, 2022; 24 pages with translation.

Notice of Allowance from corresponding Chinese Application No. 202110312836.5, dated Dec. 5, 2022, 5 pages with translation.

Extended European Search Report from corresponding European Application No. 21769625.1, dated Oct. 27, 2022, 8 pages.

Office Action from corresponding Korean Application No. 10-2021-7030233, dated Jun. 11, 2024, 16 pages with translation.

* cited by examiner sintering a mixture containing at least one of $Ni_{1-x-y}Co_xAl_y$ oxide or hydroxide, an M compound and a lithium compound to obtain a sintered product, where $0 \leq x \leq 0.15$, $0.01 \leq y \leq 0.1$, and an M element is a metal element

S100 subjecting the sintered product to washing with a solvent and drying to obtain the cathode material with a chemical formula $Li_bNi_{1-x-y}Co_xAl_yM_zO_2$, where $0.95 \leq b \leq 1.10$, $0 \leq x \leq 0.15$, $0.01 \leq y \leq 0.1$, and $0 < z \leq 0.05$; the M element is distributed in interior and surface of the cathode material, the M element distributed in the interior of the cathode material is presented in a doped form, and the M element distributed in the surface of the cathode material is presented in a form of a coating layer formed of at least one of M oxide or lithium-M composite oxide; and a molar ratio of the M element in the interior to the M element in the surface is greater than 0.5.

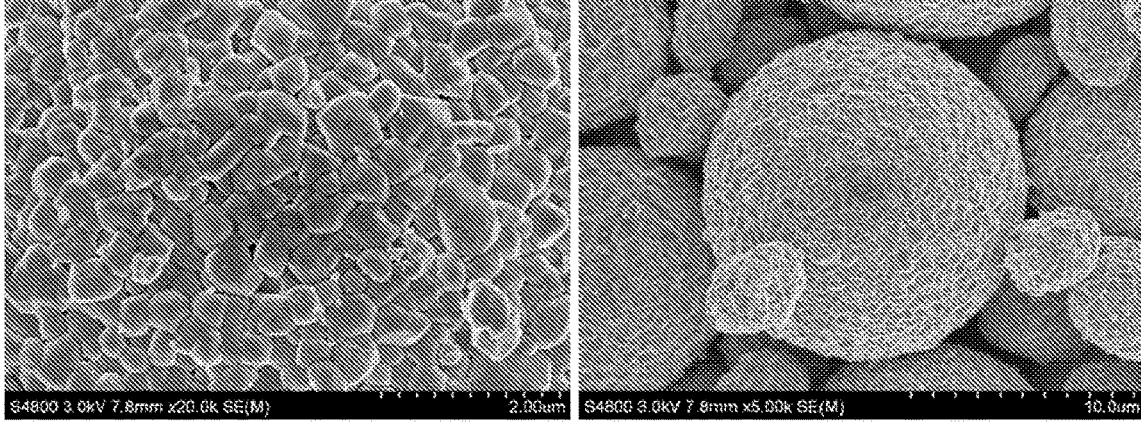

FIG. 2a                    FIG. 2b

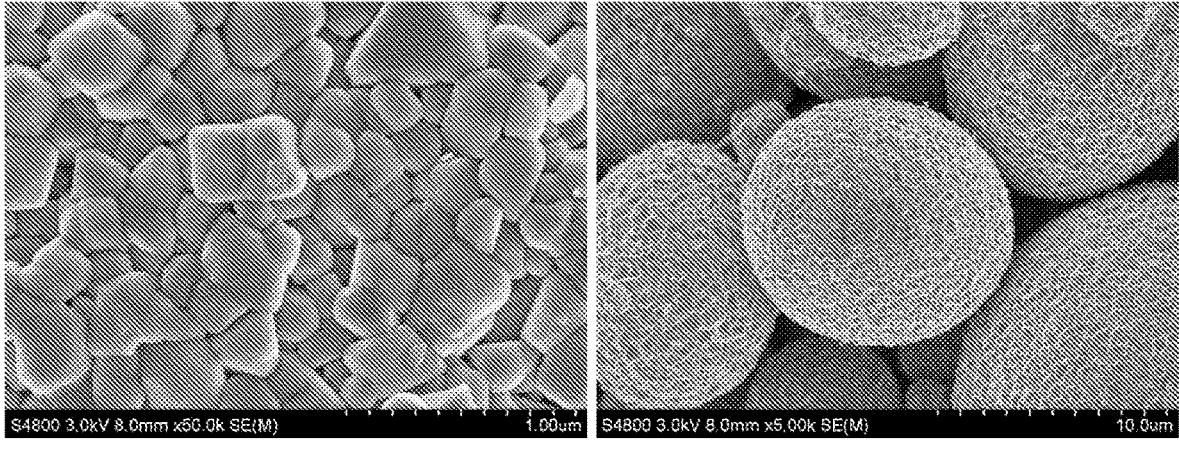
FIG. 3a                    FIG. 3b
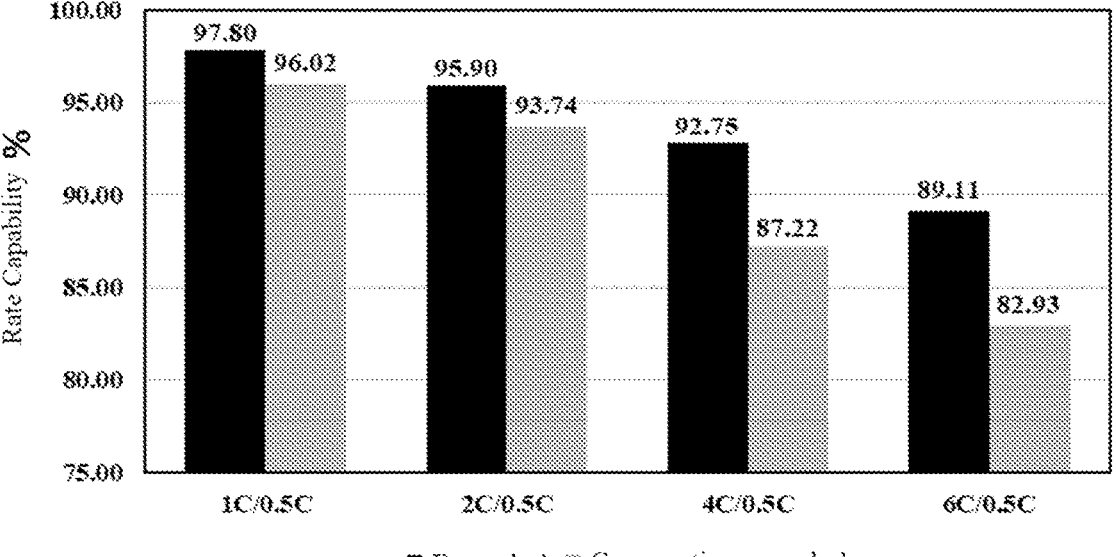
FIG. 4

CATHODE MATERIAL AND PREPARATION METHOD THEREOF AND SECONDARY LITHIUM BATTERY

CROSS-REFERENCE TO RELATED APPLICATIONS

The present application is a National Phase of International Application No. PCT/CN2021/082711, filed on Mar. 24, 2021, which claims the priority to Chinese patent application No. 2020102290983 entitled "cathode material and preparation method thereof and secondary lithium battery" filed with CNIPA on Mar. 27, 2020, the entire contents of both of which are incorporated herein by reference in their entireties.

TECHNICAL FIELD

The present application relates to the field of secondary lithium batteries, particularly, to a cathode material and a preparation method thereof and a secondary lithium battery, more particularly, to a nickel-rich ternary cathode material and a preparation method thereof and a secondary lithium battery.

BACKGROUND

Environmental pollution and energy crisis have become two major problems in the development of the world today. It is urgent to solve the excessive consumption of traditional fossil energy and the thus caused environmental problems. The development and utilization of new energy has been paid more and more attention by countries all over the world. The development of new energy electric vehicles is an important route to improve the competitiveness of China's automobile industry, ensure energy security and develop low-carbon economy. The key to the development of electric vehicles lies in the development of power batteries. However, new energy electric vehicles have not been widely accepted by people. This is mainly because there is still a big gap in price, cruising range and safety of electric vehicles compared with traditional fuel vehicles. As the core component and development bottleneck of electric vehicles, lithium-ion power batteries play a decisive role. The cathode material is a key factor affecting the cost, energy density and safety of lithium-ion batteries. The energy densities of lithium cobalt oxide, lithium iron phosphate, and lithium manganate are all lower than 180 mAh/g, which cannot meet the increasing demand for energy density in the application field of lithium-ion batteries. As a new type of cathode materials, nickel-rich ternary materials have comprehensive advantages of high energy density, high working voltage and high compact density, and have been widely used in the field of 3 C and power batteries.

With the continuous increase of nickel content in nickel-rich ternary materials, the high rate capability and the thermal stability of the materials have been greatly challenged. The current methods to improve the rate capability and thermal stability of the materials mainly include doping and coating. Conventional coating modification not only requires an additional cost of coating accessories, but also requires additional processes, such as mixing and heat treatment, which increases the complexity of the process, resulting in higher requirements for process stability control and higher processing cost. Doping modification can be implemented in the two procedures, precursor preparation and sintering, and the biggest problem of doping in the precursor preparation is the increase of process complexity of the precursor preparation.

Therefore, there is a need to develop a high-nickel ternary cathode material having high rate capability and high thermal stability as well as the advantages of both doping and coating modification with a simple process and low cost.

SUMMARY

In view of the above-mentioned problems in the related process, the purpose of the present application is to provide a cathode material and a preparation method thereof, and a secondary lithium battery. The cathode material provided in the present application can take into account both the rate capability and thermal stability of a cathode material.

For this purpose, the present application adopts the following technical solutions.

In a first aspect, the present application provides a cathode material with a chemical formula $Li_bNi_{1-x-y}Co_xAl_yM_zO_2$, where $0.95 \le b \le 1.10$, $0 \le x \le 0.15$, $0.01 \le y \le 0.1$, $0 < z \le 0.05$, and an M element is a metal element;

the M element is distributed in interior and surface of the cathode material, the M element distributed in the interior of the cathode material is presented in a doped form, and the M element distributed in the surface of the cathode material is presented in a form of a coating layer formed of at least one of M oxide or lithium-M composite oxide, and a molar ratio of the M element in the interior to the M element in the surface is greater than 0.5 and less than 1.5, and wherein when performing element line scan by a high-precision electron spectrometer along an approximate diameter direction in a cross-section of a particle of the cathode material cut by an ion beam cutter, the surface is defined as at an end of the diameter of the line analysis, and the interior is defined as at a center of the diameter.

In conjunction with the first aspect, in a feasible embodiment, the cathode material satisfies at least one of the following conditions a to d:

a. the M element is at least one selected from Al, Mn, Mg, Sr, Ca, Zr, Ti, La, W, Nb, Y or Gd;

b. a total content of the M element in the cathode material is in a range from 500 ppm to 5000 ppm;

c. a lithium content in the surface of the cathode material is 0.02 wt % to 0.12 wt % of a total mass of the cathode material; and d. a carbon content in the surface of the cathode material is 0.01 wt % to 0.035 wt % of the total mass of the cathode material.

In conjunction with the first aspect, in a feasible embodiment, the cathode material satisfies at least one of the following conditions a to f:

a. the cathode material is a secondary particle composed of primary particles, and the secondary particle has an internally dense structure;

b. a particle of the cathode material is spherical or quasi-spherical;

c. an average particle size of the cathode material is in a range from 3 μm to 20 μm;

d. D95 of the cathode material is greater than 20 μm;

e. a specific surface area of the cathode material is in a range from 0.5 m²/g to 2.0 m²/g; and f. an initial discharge capacity of the cathode material in a 2032 coin cell is greater than or equal to 200 mAh/g.

In a second aspect, the present application provides a method for preparing a cathode material, the method including the following steps:

sintering a mixture containing at least one of $Ni_{1-x-y}Co_xAl_y$ oxide or hydroxide, an M compound and a lithium compound to obtain a sintered product, where $0 \leq x \leq 0.15$, $0.01 \leq y \leq 0.1$, and an M element is a metal element; and subjecting the sintered product to washing with a solvent and drying to obtain the cathode material with a chemical formula $Li_bNi_{1-x-y}Co_xAl_yM_zO_2$, where $0.95 \leq b \leq 1.10$, $0 \leq x \leq 0.15$, $0.01 \leq y \leq 0.1$, $0 < z \leq 0.05$, the M element is distributed in interior and surface of the cathode material, the M element distributed in the interior of the cathode material is presented in a doped form, and the M element distributed in the surface of the cathode material is presented in a form of a coating layer formed of at least one of M oxide or lithium-M composite oxide, wherein a molar ratio of the M element in the interior to the M element in the surface is greater than 0.5.

In conjunction with the second aspect, in a feasible embodiment, the cathode material satisfies at least one of the following conditions a to e:

a. a lithium content in the surface of the cathode material is 0.02 wt % to 0.12 wt % of a total mass of the cathode material;

b. a carbon content in the surface of the cathode material is 0.01 wt % to 0.035 wt % of the total mass of the cathode material;

c. an average particle size of the cathode material is in a range from 3 μm to 20 μm;

d. a specific surface area of the cathode material is in a range from 0.5 m²/g to 2.0 m²/g; and e. an initial discharge capacity of the cathode material in a 2032 coin cell is greater than or equal to 200 mAh/g.

In conjunction with the second aspect, in a feasible embodiment, the method satisfies at least one of the following conditions a to h:

a. the M compound is a hydroxide of at least one of M or an oxide of M;

b. the M element is at least one selected from Al, Mn, Mg, Sr, Ca, Zr, Ti, La, W, Nb, Y, or Gd;

c. the lithium compound includes at least one of lithium carbonate, lithium hydroxide, lithium acetate, lithium nitrate, or lithium oxalate;

d. a ratio of a molar content of lithium in the lithium compound to a sum of molar contents of Ni, Co, Al and M in the mixture is (0.97-1.15):1;

e. a total content of the M element in the cathode material is in a range from 500 ppm to 5000 ppm;

f. an average particle size of the M compound is smaller than 5 μm;

g. the M compound is the hydroxide of M, and an average particle size of the hydroxide of M is in a range from 1 μm to 5 μm; and h. the M compound is the oxide of M, and an average particle size of the oxide of M is smaller than 200 nm.

In conjunction with the second aspect, in a feasible embodiment, the method satisfies at least one of the following conditions a to c:

a. the sintering is carried out in an atmosphere with an oxygen content greater than or equal to 90%;

b. a temperature of the sintering is in a range from 650° C. to 900° C.; and c. the sintering lasts for 6 h-30 h.

In conjunction with the second aspect, in a feasible embodiment, before said subjecting the sintered product to washing with a solvent and drying to obtain the cathode material, the method further includes:

mixing a non-aqueous substance with water to obtain the solvent, wherein the non-aqueous substance includes at least one of an acid, an organic solvent, a phosphate, or an ammonium compound.

In conjunction with the second aspect, in a feasible embodiment, the method satisfies at least one of the following conditions a to d:

a. the acid includes at least one of $H_3PO_4$, $H_2C_2O_4$, $H_3BO_3$, or HCl;

b. the organic solvent includes at least one of $C_2H_5OH$ or $C_3H_8O$;

c. the phosphate includes at least one of $NH_4H_2PO_4$, $(NH_4)_2HPO_4$, $(NH_4)_3PO_4$, $NaH_2PO_4$, $Na_2HPO_4$, or $Na_3PO_4$; and d. the ammonium compound includes at least one of $NH_4Cl$ or $NH_4NO_3$.

In conjunction with the second aspect, in a feasible embodiment, a concentration of a slurry composed of the sintered product and the solvent (sintered product (g)/solvent (L)) is in a range from 500 g/L to 2000 g/L.

In a third aspect, the present application provides a secondary lithium battery, which includes the cathode material of the foregoing first aspect or the cathode material prepared by the method of the foregoing second aspect.

Compared with the related process, the present application has the following beneficial effects.

(1) In the cathode material provided in the present application, the M element is distributed in the interior and the surface of the cathode material particles, and the molar ratio of the M element in the interior to the M element in the surface of the cathode material is greater than 0.5. The M element in the interior of the cathode material is mainly present in a doped form. By doping the M element, the layered structure of the material is optimized, the phase change of the material is suppressed, the structural stability of the material is improved, and thus the thermal stability of the cathode material is improved. The M element in the surface is presented in a form of at least one of M oxide or lithium-M composite oxide to form a LiMO/MO structured coating layer to inhibit the reaction of the cathode material with the electrolyte, which not only protects the surface of the cathode material from being corroded by the electrolyte and improves the thermal stability, but also improve the lithium ion conductivity of the cathode material and the lithium ion diffusion rate, finally enabling the obtained cathode material to have both high rate capability and thermal stability. When the molar ratio of the M element in the interior to in the surface of the cathode material particles is smaller than 0.5, a severe Li/Ni cation mixed arrangement in the cathode material will occur, and moreover, both the structural stability and thermal stability of the cathode material during the cycle will decrease. When excess M oxide or lithium-M composite oxide are present in the surface, the surface impedance of the cathode material will increase and the lithium ion diffusion coefficient will decrease, and finally reducing the rate capability of the cathode material. Therefore, by controlling the molar ratio of the M element in the interior to the M element in the surface of the cathode material, both the rate capability and the thermal stability of the cathode material can be obtained.

(2) The present application provides a method for preparing a cathode material which is simple, stable, safe, and easy for large scale industrial production. The preparation method not only achieves both doping modification and coating modification in one step, synergizing the advantages of the two modifications with a simple process and a low cost, but also by introducing a non-aqueous substance for washing, effectively controls the surface structure and the lithium content of the surface of the cathode material particles, improves the anti-corrosion and the lithium ion conductivity of the particle surface, and reduces the gas production, thereby effectively obtaining the superior discharge capacity, rate capability, safety performance and cycle performance.

BRIEF DESCRIPTION OF DRAWINGS

FIG. 1 is a process flowsheet of a method for preparing a cathode material provided by an embodiment of the present application;

FIG. 2a and FIG. 2b are scanning electron microscope pictures of the cathode material of Example 1 with different magnifications;

FIG. 3a and FIG. 3b are scanning electron microscope pictures of the cathode material of Comparative Example 1 with different magnifications;

FIG. 4 is a graph of rate capability of Example 1 and Comparative Example 1 of the present application;

DESCRIPTION OF EMBODIMENTS

Figure 5:
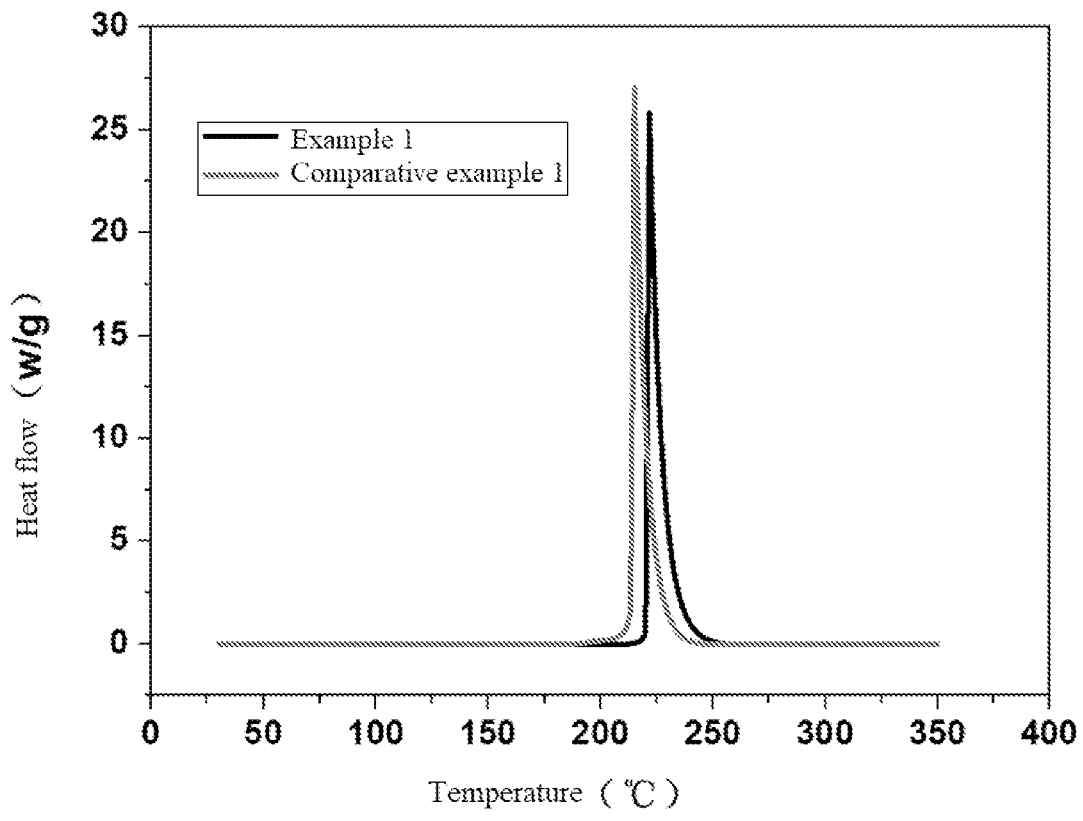
FIG. 5 shows differential scanning calorimetry (DSC) curves of Example 1 and Comparative Example 1 of the present application.

In order to better explain the present application and facilitate the understanding of the technical solutions of the present application, the present application will be further described in detail below. However, the following embodiments are only simple examples of the present application, which do not represent or limit the protection scope of the clams of the present application. The protection scope of the present application is subject to the claims.

The following are typical but non-limiting examples of the present application.

At present, with the continuous increase of nickel content in nickel-rich ternary materials, the high rate capability and the thermal stability of the materials have been greatly challenged. Therefore, the present application provides a high-nickel ternary cathode material having high rate capability and high thermal stability as well as the advantages of both doping and coating modifications with a simple process and low cost, and a preparation method thereof.

In a first aspect, the present application provides a cathode material with a chemical formula $Li_bNi_{1-x-y}Co_xAl_yM_zO_2$, where $0.95 \leq b \leq 1.10$, $0 \leq x \leq 0.15$, $0.01 \leq y \leq 0.1$, $0 < z \leq 0.05$, and an M element is a metal element;

the M element is distributed in interior and surface of the cathode material, the M element distributed in the interior of the cathode material is presented in a doped form, and the M element distributed in the surface of the cathode material is presented in a form of a coating layer formed of at least one of M oxide or lithium-M composite oxide; and a molar ratio of the M element in the interior to the M element in the surface is greater than 0.5.

In the cathode material provided in the present application, the M element is distributed in the interior and the surface of the cathode material particles, and the molar ratio of the M element in the interior to the M element in the surface of the cathode material is greater than 0.5. The M element in the interior of the cathode material is mainly present in a doped form. By doping the M element, the layered structure of the material is optimized, the phase change of the material is suppressed, the structural stability of the material is improved, and thus the thermal stability of the cathode material is improved. The M element in the surface is presented in a form of at least one of M oxide or lithium-M composite oxide to form a LiMO/MO structured coating layer to inhibit the reaction of the cathode material with the electrolyte, which not only protects the surface of the cathode material from being corroded by the electrolyte and improves the thermal stability, but also increases the lithium ion conductivity of the cathode material and the lithium ion diffusion rate, finally enabling the obtained cathode material to have both high rate capability and thermal stability. When the molar ratio of the M element in the interior to in the surface of the cathode material particles is smaller than 0.5, a severe Li/Ni cation mixed arrangement in the cathode material will occur, and moreover, both the structural stability and thermal stability of the cathode material during the cycle will be reduced. When excess M oxide or lithium-M composite oxide are present in the surface, the surface impedance of the cathode material will increase and the lithium ion diffusion coefficient will decrease, and finally the rate capability of the cathode material. Therefore, by controlling the molar ratio of the M element in the interior to the M element in the surface of the cathode material, both the rate capability and the thermal stability of the cathode material can be obtained.

Specifically, b can take a value of 0.95, 1.0, 1.05, or 1.10, etc., x can take a value of 0, 0.01, 0.02, 0.03, 0.05, 0.08, 0.10, 0.12, or 0.15, etc., y can be 0.01, 0.02, 0.03, 0.04, 0.05, 0.06, 0.07, 0.08, 0.09, or 0.1, etc., and z can be 0.001, 0.005, 0.010, 0.015, 0.020, 0.025, 0.030, 0.035, 0.040, 0.045, or 0.050, etc., which are not limited here.

As an optional technical solution of the present application, the M element in $Li_bNi_{1-x-y}Co_xAl_yM_zO_2$ can be at least one selected from Al, Mn, Mg, Sr, Ca, Zr, Ti, La, W, Nb, Y, and Gd. In other embodiments, the M element may also be other metal elements.

It should be noted that due to the close radii of Li and Ni, during the delithiation process, Li deintercalates to form Li-vacancies, and Ni is prone to migrate to the lithium site, resulting in the cation disordering. Therefore, in the process of repeated cycles, the mixing ratio increases, and the layered structure of the cathode material is prone to collapse, resulting in a significant decrease in the cell performance. Therefore, by doping the M element, the change of the layered structure of the cathode material during the lithium deintercalation process can be buffered, and the high-rate capability and thermal stability of the material can be improved.

As an optional technical solution of the present application, the molar ratio of the M element in the interior to the M element in the surface of the cathode material particles is greater than 0.5, specifically the molar ratio may be 0.55, 0.6, 0.7, 1.0, 1.5 or 2.0, etc. When the molar ratio of the M element in the interior to the M element in the surface of the cathode material particles is smaller than 0.5, severe Li/Ni cation mixing in the cathode material structure will be caused, and both the structural stability and thermal stability of the cathode material during cycling will decrease; when excess M oxide or lithium-M composite oxide are distributed in the surface, the surface impedance of the cathode material will increase and the lithium ion diffusion coefficient will decrease, finally reducing the rate capability. Therefore, by controlling the molar ratio of the M element in the interior to the M element in the surface in the cathode material particles at 0.5 or more, both the high-rate capability and the high thermal stability of the cathode material can be obtained.

As an optional technical solution of the present application, the M element is derived from an M compound with an average particle size of smaller than 5 μm, and the M compound and a lithium compound can react at 650° C. or lower to generate the lithium-M composite oxide, so that the M element can be doped into the cathode material particle, increasing the M content in the interior of the particle to ensure that the molar ratio of the M element in the interior to the M element in the surface of the cathode material particles is greater than 0.5.

As an optional technical solution of the present application, a total content of the element M in the cathode material is in a range from 500 ppm to 5000 ppm, and specifically can be 500 ppm, 700 ppm, 900 ppm, 1000 ppm, 1200 ppm, 2000 ppm, 2500 ppm, 3000 ppm, 4000 ppm or 5000 ppm, etc. When the total content of M element in the cathode material is smaller than 500 ppm, the improvement effect on the structural stability of the material is limited, and the cathode material is prone to change in phase during the cycle; when the total content of M element in the cathode material is higher than 5000 ppm, the capacity of the material will decrease while the resistance of the material will increase. Controlling the content of M element within the above range can not only obtain good doping and coating effects, but also have a higher capacity. Preferably, the total content of the M element in the cathode material is in a range from 700 ppm to 2000 ppm.

As an optional technical solution of the present application, the cathode material is a secondary particle composed of primary particles, and has an internally dense structure. It should be noted that the primary particle is a single fine crystal particle, and the secondary particle is a particle formed by agglomeration of the primary particles. Preferably, the secondary particle is an aggregate of the primary particles, and the interior of the secondary particle is compact, and the secondary particle is spherical or quasi-spherical, that is, the cathode material can be spherical or quasi-spherical.

Compared with a porous structure, the secondary particle, which has an internally dense structure formed by tightly aggregating the primary particles, not only helps to increase the compact density and particle compressive strength of the cathode material, but also effectively prevents the electrolyte from permeating into the particle to corrode the cathode material. The spherical structure has higher compact density and lithium ion diffusion coefficients than an irregular topography structure. A dense spherical structure is also beneficial to improve the volumetric energy density, rate capability and thermal stability of the secondary lithium battery.

As an optional technical solution of the present application, an average particle size of the cathode material is in a range from 3 μm to 20 μm, specifically 3 μm, 4 μm, 5 μm, 7 μm, 9 μm, 12 μm, 15 μm, 18 μm, or 20 μm, etc., preferably in a range from 10 μm to 13 μm. Through many experiments, it was found that when the average particle size of the cathode material is controlled in the range of 3 μm-20 μm, the cracking of the cathode material during the cycle can be avoided, which is beneficial to improve the structural stability, thermal stability and long-term cycling stability of the cathode material.

Optionally, the cathode material satisfies: D95>20 μm, for example, 20.5 μm, 21.5 μm, 22 μm, or 25 μm, etc.

As an optional technical solution of the present application, a specific surface area of the cathode material is 0.5 $m^2/g$-2.0 $m^2/g$, specifically 0.5 $m^2/g$, 0.7 $m^2/g$, 0.9 $m^2/g$, 1.1 $m^2/g$, 1.3 $m^2/g$, 1.5 $m^2/g$, 1.8 $m^2/g$ or 2.0 $m^2/g$, etc. When the specific surface area of the cathode material is controlled within the range of 0.5 $m^2/g$-2.0 $m^2/g$, it is beneficial to improve the cycle performance of the lithium battery produced by the cathode material. Preferably, the specific surface area of the cathode material is in a range from 0.7 $m^2/g$-1.5 $m^2/g$.

As an optional technical solution of the present application, a lithium content in the surface of the cathode material is in a range from 0.02 wt % to 0.12 wt % of a total mass of the cathode material, and specifically can be 0.02 wt %, 0.05 wt %, 0.10 wt % or 0.12 wt %, etc., preferably in a range from 0.05 wt % to 0.10 wt %. Controlling the lithium content in the surface of the cathode material within a certain range can prevent the residual lithium on the surface from reacting with the electrolyte to produce gas during the cycle of the battery to affect the battery safety.

As an optional technical solution of the present application, a carbon content in the surface of the cathode material is in a range from 0.01 wt % to 0.035 wt % of the total mass of the cathode material, and specifically can be 0.01 wt %, 0.015 wt %, 0.02 wt %, 0.025 wt %, 0.03 wt % or 0.035 wt %, etc. The carbon in the surface of the cathode material exists in a form of lithium carbonate. Controlling the carbon content in the surface of the cathode material within a certain range can suppress the safety problem caused by gas production of the material during the cycle.

As an optional technical solution of the present application, an initial discharge capacity of the cathode material in a 2032 coin cell is greater than or equal to 200 mAh/g.

In a second aspect, an embodiment of the present application also provides a method for preparing a cathode material, as shown in FIG. 1, the method including the following steps S100 to S200:

step S100, sintering a mixture containing at least one of $Ni_{1-x-y}Co_xAl_y$ oxide or hydroxide, an M compound and a lithium compound to obtain a sintered product, where $0 \leq x \leq 0.15$, $0.01 \leq y \leq 0.1$, and an M element is a metal element; and step S200, subjecting the sintered product to washing with a solvent and drying to obtain the cathode material with a chemical formula $Li_bNi_{1-x-y}Co_xAl_yM_zO_2$, where $0.95 \leq b \leq 1.10$, $0 \leq x \leq 0.15$, $0.01 \leq y \leq 0.1$, $0 < z \leq 0.05$, the M element is distributed in interior and surface of the cathode material, the M element distributed in the interior of the cathode material is presented in a doped form, and the M element distributed in the surface of the cathode material is presented in a form of a coating layer formed of at least one of M oxide or lithium-M composite oxide, wherein a molar ratio of the M element in the interior to the M element in the surface is greater than 0.5.

The preparation method provided in the present application can achieve both doping modification and coating modification in one step, which synergizes the advantages of the two modifications with a simple process and a low cost; and by introducing a non-aqueous substance for washing, the surface structure and the lithium content of the surface of the cathode material particle are effectively controlled, the anti-corrosion and the lithium ion conductivity of the particle surface are improved, and the gas production is reduced, thereby effectively obtaining all of the discharge capacity, rate capability, safety performance and cycle performance.

The following is a specific introduction to the above solution:

In the step S100, sintering a mixture containing at least one of $Ni_{1-x-y}Co_xAl_y$ oxide or hydroxide, an M compound, and a lithium compound to obtain a sintered product.

As an optional technical solution of the present application, the M compound is added to achieve the internal doping and surface coating of the cathode material in one step during sintering procedure, which synergizes the advantages of the two modifications, saves the coating procedure, reduces the process complexity, and saves the manufacturing cost.

Optionally, the M element may be at least one selected from Al, Mn, Mg, Sr, Ca, Zr, Ti, La, W, Nb, Y, or Gd. In other embodiments, the M element may also be other metal elements.

As an optional technical solution of the present application, the M compound is at least one of a hydroxide or an oxide of M. In other embodiments, the M compound can also be other substances that can react with a lithium compound at 650° C. or lower to generate the lithium-M composite oxide, and therefore it is not limited to the hydroxide or oxide of M. An average particle size of the M compound is smaller than 5 μm.

As an optional technical solution of the present application, an average particle size (D50) of the M hydroxide is in a range from 1 μm to 5 μm; specifically, it can be 1 μm, 1.5 μm, 2 μm, 2.5 μm, 3 μm, 3.5 μm, 4 μm, 4.5 μm or 5 μm, etc.; of course, it can also be other values within the above range, which is not limited here.

As an optional technical solution of the present application, an average particle size (D50) of the M oxide is smaller than 200 nm; specifically, it can be 199 nm, 190 nm, 180 nm, 170 nm, 160 nm, 150 nm, 140 nm, etc.; of course, it can also be other values within the above range, which is not limited here.

According to the solid-phase reaction kinetics and interface reaction theory, the embodiments of the present application can control the molar ratio of the M element in the interior to the M element in the surface of the cathode material by selecting an appropriate type and particle size of the M compound.

Specifically, the particle size of the M compound is smaller than 5 μm. The smaller the particle size of the M compound, the larger the specific surface area, and the more sufficient the surface contact between the M compound and at least one of the $Ni_{1-x-y}Co_xAl_y$ oxide or hydroxide, and the higher the reaction activity therebetween during the sintering, so that the M element is more prone to diffuse into the interior of the cathode material and to be evenly distributed in the surface, achieving uniform doping in the interior of the cathode material and uniform coating in the surface of the cathode material, and the larger the molar ratio of the M element distributed in the interior to the M element distributed in surface of the cathode material. When the particle size of the M compound is greater than 5 μm, during the sintering process, the M compound tends to exist in a form of large particles on the surface of the cathode material, so that the molar ratio of the M element in the interior of the cathode material to the M element in the surface is relatively small, that is, the M element diffused into the interior of the cathode material is reduced. Moreover, if the particle size of the M compound is too large, the adhesion of the M compound with the surface of the cathode material will be more unstable, uneven coating is likely to occur, the phenomenon of shedding is likely to occur during the battery cycle, and thus the desirable coating cannot be achieved.

As an optional technical solution of the present application, the lithium compound includes at least one of lithium carbonate, lithium hydroxide, lithium acetate, lithium nitrate, or lithium oxalate, and is preferably lithium hydroxide.

As an optional technical solution of the present application, an average particle size of the lithium compound is in a range from 3 μm to 20 μm, and specifically can be 3 μm, 5 μm, 6 μm, 10 μm, 13 μm, 15 μm, 18 μm, or 20 μm, which is not limited here.

As an optional technical solution of the present application, a ratio of a molar content of lithium in the lithium compound to a sum of molar contents of Ni, Co, Al and M in the mixture is in a range from 0.97:1 to 1.15:1. With the molar ratio controlled within this range, the mixing degree of Li/Ni cations can be effectively reduced, and the lithium residue on the surface of the sintered product can be prevented from to be excessively high to affect processing performance and safety performance.

As an optional technical solution of the present application, a total content of the element M in the cathode material is in a range from 500 ppm to 5000 ppm, and specifically can be 500 ppm, 700 ppm, 900 ppm, 1000 ppm, 1200 ppm, 2000 ppm, 2500 ppm, 3000 ppm, 4000 ppm or 5000 ppm, etc. When the total content of M element in the cathode material is smaller than 500 ppm, the improvement effect on the structural stability of the material is limited, and the cathode material is prone to change in phase during the cycle; when the total content of M element in the cathode material is higher than 5000 ppm, the capacity of the material will decrease while the resistance of the material will increase. Controlling the content of M element within the above range can not only obtain good doping and coating effects, but also have a higher capacity. Preferably, the total content of the M element in the cathode material is in a range from 700 ppm to 2000 ppm.

As an optional technical solution of the present application, the sintering is carried out in an atmosphere with an oxygen content greater than or equal to 90%. Specifically, the atmosphere may include oxygen with a volume ratio of 90% or greater and the remaining inactive gas, such as nitrogen and inert gas. The inert gas may be helium, argon, neon, or the like. In addition, as long as the oxygen content is within the above range, the atmosphere may also be a mixed gas of oxygen and air.

As an optional technical solution of the present application, a temperature of the sintering is in a range from 650° C. to 900° C. Within this range, sufficient oxygen can promote the oxidation of divalent nickel to trivalent nickel, reduce the mixing of Li/Ni cations, and increase the capacity of the cathode material. Moreover, this temperature range is conducive to the formation of a layered structure without causing the material to decompose, preferably the temperature is in a range from 700° C. to 770° C., such as 700° C., 710° C., 720° C., 730° C., 740° C., 750° C., 760° C. or 770° C., etc. However, the temperature is not limited to the listed values, and other unlisted values within this value range are also applicable.

As an optional technical solution of the present application, the sintering lasts for 6 h-30 h, for example, 6 h, 8 h, 10 h, 12 h, 15 h, 18 h, 21 h, 24 h, 27 h or 30 h, etc. However, it is not limited to the numerical values listed, and other unlisted values within this value range are also applicable. Controlling the sintering time within the above range can help to uniformly doing the element M within at least one of $Ni_{1-x-y}Co_xAl_y$ oxide or hydroxide under the action of thermal diffusion, thereby optimizing various performance indexes of the cathode material. Preferably, the sintering lasts for 6 h-20 h.

Further, before the step S200, the method further includes: mixing a non-aqueous substance with water to obtain the solvent, wherein the non-aqueous substance includes at least one of an acid, an organic solvent, a phosphate, or an ammonium compound.

As an optional technical solution of the present application, the acid includes at least one of $H_3PO_4$, $H_2C_2O_4$, $H_3BO_3$, or HCl;

As an optional technical solution of the present application, the organic solvent includes at least one of $C_2H_5OH$ or $C_3H_8O$;

As an optional technical solution of the present application, the phosphate includes at least one of $NH_4H_2PO_4$, $(NH4)_2HPO_4$, $(NH_4)_3PO_4$, $NaH_2PO_4$, $Na_2HPO_4$, or $Na_3PO_4$;

As an optional technical solution of the present application, the ammonium compound includes at least one of $NH_4Cl$ or $NH_4NO_3$.

It should be noted that the non-aqueous substance was added in the solvent. Compared with the pure water solvent, the non-aqueous substance can be used as a washing buffer to control the lithium content in the surface of the cathode material while reducing the loss of the lithium ions present in the crystal lattice (hereinafter referred to as "lattice lithium"), so as to better protect the surface structure of the cathode material.

In step S200, subjecting the sintered product to washing with the solvent and drying to obtain the cathode material.

In this solution, in the solvent washing process, the non-aqueous substance in the solvent reacts with the residual lithium on the surface of the sintered product to form a coating layer with high lithium ion conductivity, such as $Li_3PO_4$, which not only can increases the rate capability of the material, but also can effectively reduce the degree of corrosion of the surface of the cathode material by the electrolyte, being beneficial to improve the cycle performance of the cathode material.

As an optional technical solution of the present application, a concentration of a slurry composed of the sintered product and the solvent (sintered product (g)/solvent (L)) is in a range from 500 g/L to 2000 g/L. When the slurry concentration is too high, the amount of solvent used is insufficient, which is not conducive to removing the lithium contained in the surface of the material. Too much lithium contained in the surface of the cathode material is prone to cause severe gas production and increased surface impedance. On the contrary, when the slurry concentration is too low or the washing time is too long, it is easy to cause damage to the structure between the primary particles in the material, the loss of the lattice lithium in the primary particles on the surface of the secondary particle composed of the primary particles, and the loss of M oxide or lithium-M composite compound on the surface.

In the embodiment of the present application, subjecting the sintered product to washing with the solvent, filtering, and drying to obtain the cathode material powder. Controlling the lithium content of the surface of the cathode material by controlling the washing conditions has a very important effect on the performance of the cathode material. Controlling the lithium content of the surface of the cathode material is beneficial to obtain all of the processing performance, rate capability and safety performance of the cathode material.

In a third aspect, embodiments of the present application also provide a secondary lithium battery, which adopts the cathode material provided in the first aspect of the present application or the cathode material obtained according to the preparation method of the second aspect.

The embodiments of the present application are not limited to the following specific examples. The above-mentioned embodiments can be implemented with appropriate changes and combinations, while not changing the scope of the main claims.

Hereinafter, the embodiments of the present application will be further described with multiple examples in conjunction with the accompanying drawings.

The "ppm" of addition amounts present in each of the examples and comparative examples of the present application are all mass concentrations relative to the entire cathode material.

Example 1

In this example, the cathode material was prepared according to the following method:

(1) first, evenly mixing $Ni_{0.88}Co_{0.09}Al_{0.03}O_2$ oxide, lithium hydroxide, and $Mg(OH)_2$ with a D50 of 2.5 μm in a high-speed mixer (Li/(Ni+Co+Al+Mg)=1.08, Mg is 3000 ppm), finally sintering the above mixture at 760° C. in an atmosphere of 95% oxygen+5% nitrogen for 10 h, and obtaining a Mg modified sintered product $Li_{1.08}Ni_{0.88}Co_{0.09}Al_{0.03}Mg_{0.013}O_2$ after crushing and sieving; and (2) mixing the above-mentioned sintered product $Li_{0.08}Ni_{0.88}Co_{0.09}Al_{0.03}Mg_{0.013}O_2$ with an aqueous solution containing 1.5 wt % $H_3PO_4$ to form a slurry with a slurry concentration of 1000 g/L (sintered product (g)/$H_3PO_4$ aqueous solution (L)), and obtaining the cathode material $LiNi_{0.88}Co_{0.09}Al_{0.03}Mg_{0.13}O_2$ after washing, filtering and drying, the cathode material having an average particle size of 12.5 μm, D95 of 21.3 μm, and a specific surface area of 1.13 m²/g.

Figure 6:
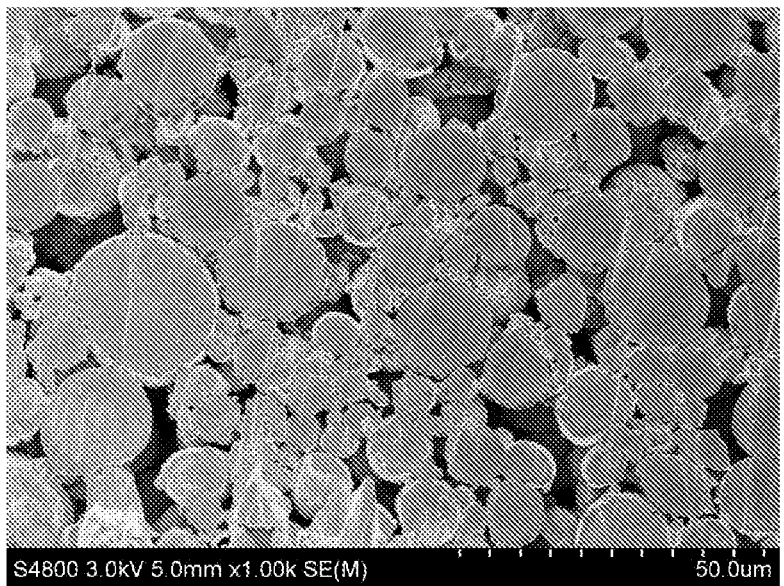
FIG. 6 is a scanning electron microscope picture of a cross-section of the cathode material of Example 1 of the present application.

The scanning electron microscope pictures of the cathode material prepared in this example are shown in FIG. 2a and FIG. 2b. It can be seen from FIG. 2b that the cathode material particles are spherical or quasi-spherical. The scanning electron microscope picture of a cross-section of the cathode material prepared in this example is shown in FIG. 6. Table 1 shows the test results of the cathode material prepared in this example.

Example 2

In this example, the cathode material was prepared according to the following method:

(1) first, evenly mixing $Ni_{0.76}Co_{0.15}Al_{0.09}(OH)_2$ pre-sintered hydroxide, lithium hydroxide, and $Mg(OH)_2$ with D50 of 2.5 μm in a high-speed mixer (Li/(Ni+Co+Al+Mg)=1.10, Mg is 1000 ppm), finally sintering the above mixture at 850° C. in an atmosphere of 90% oxygen+10% nitrogen for 26 h, and obtaining a Mg modified sintered product $Li_{1.10}Ni_{0.76}Co_{0.15}Al_{0.09}Mg_{0.0004}O_2$ after crushing and sieving; and (2) mixing the above-mentioned sintered product $Li_{1.10}Ni_{0.76}Co_{0.15}Al_{0.09}Mg_{0.004}O_2$ with an aqueous solution containing 1.0 wt % $H_3PO_4$ to form a slurry with a slurry concentration of 500 g/L (sintered product (g)/$H_3PO_4$ aqueous solution (L)), and obtaining the cathode material $LiNi_{0.76}Co_{0.15}Al_{0.09}Mg_{0.004}O_2$ after washing, filtering and drying, the cathode material having an average particle size of 15.3 μm, D95 of 24.6 μm, and a specific surface area of 0.76 m²/g.

Table 1 shows the performance test results of the cathode material prepared in this example.

Example 3

In this example, the cathode material was prepared according to the following method:

(1) first, evenly mixing $Ni_{0.98}Co_{0.01}Al_{0.01}(OH)_2$ hydroxide, lithium hydroxide, and $Al_2O_3$ with D50 of 30 nm in a high-speed mixer (Li/(Ni+Co+Al)=1.02, Al is 10000 ppm), finally sintering the above mixture at 670° C. in an atmosphere of 98% oxygen+2% nitrogen for 9 h, and obtaining an Al modified sintered product $Li_{1.02}Ni_{0.98}Co_{0.01}Al_{0.01}Al_{0.04}O_2$ after crushing and sieving; and (2) mixing the above-mentioned sintered product $Li_{1.02}Ni_{0.98}Co_{0.01}Al_{0.01}Al_{0.04}O_2$ with an aqueous solution containing 1.0 wt % $(NH_4)_2HPO_4$ to form a slurry with a slurry concentration of 2000 g/L (sintered product (g)/$(NH_4)_2HPO_4$ aqueous solution (L)), and obtaining the cathode material $LiNi_{0.98}Co_{0.01}Al_{0.01}Al_{0.04}O_2$ after washing, filtering and drying, the cathode material having an average particle size of 8.2 μm, D95 of 20.1 μm, and a specific surface area of 1.33 m²/g.

Table 1 shows the performance test results of the cathode material prepared in this example.

Example 4

In this example, the cathode material was prepared according to the following method:

(1) first, evenly mixing $Ni_{0.88}Co_{0.09}Al_{0.03}O_2$ oxide, lithium hydroxide, and $Nb_2O_5$ with D50 of 50 nm in a high-speed mixer (Li/(Ni+Co+Al+Nb)=0.98, Nb is 2000 ppm), finally sintering the above mixture at 770° C. in an atmosphere of 95% oxygen+5% nitrogen for 10 h, and obtaining a Nb modified sintered product $Li_{0.98}Ni_{0.88}Co_{0.09}Al_{0.03}Nb_{0.002}O_2$ after crushing and sieving; and (2) mixing the above-mentioned sintered product $Li_{0.98}Ni_{0.88}Co_{0.09}Al_{0.03}Nb_{0.002}O_2$ with an aqueous solution containing 1.5 wt % $(NH_4)_2HPO_4$ to form a slurry with a slurry concentration of 1500 g/L (sintered product (g)/$(NH_4)_2HPO_4$ aqueous solution (L)), and obtaining the cathode material $LiNi_{0.88}Co_{0.09}Al_{0.03}Nb_{0.002}O_2$ after washing, filtering and drying, the cathode material having an average particle size of 10.7 μm, D95 of 22.1 μm, and a specific surface area of 0.96 m²/g.

Table 1 shows the performance test results of the cathode material prepared in this example.

Example 5

In this example, the cathode material was prepared according to the following method:

(1) first, evenly mixing $Ni_{0.88}Co_{0.09}Al_{0.03}(OH)_2$ hydroxide, lithium hydroxide, and $Al(OH)_3$ with D50 of 2.0 μm in a high-speed mixer (Li/(Ni+Co+Al)=1.08, Al is 8000 ppm), finally sintering the above mixture at 750° C. in an atmosphere of 95% oxygen+5% nitrogen for 1 h, and obtaining a Al modified sintered product $Li_{1.08}Ni_{0.88}Co_{0.09}Al_{0.03}Al_{0.03}O_2$ after crushing and sieving; and (2) mixing the above-mentioned sintered product $Li_{1.08}Ni_{0.88}Co_{0.09}Al_{0.03}Al_{0.03}O_2$ with an aqueous solution containing 1.5 wt % $NH_4NO_3$ to form a slurry with a slurry concentration of 900 g/L (sintered product (g)/$NH_4NO_3$ aqueous solution (L)), and obtaining the cathode material $LiNi_{0.88}Co_{0.09}Al_{0.03}Al_{0.03}O_2$ after washing, filtering and drying, the cathode material having an average particle size of 11.4 μm, D95 of 21.5 μm, and a specific surface area of 1.28 m²/g.

Table 1 shows the performance test results of the cathode material prepared in this example.

Example 6

In this example, the cathode material was prepared according to the following method:

(1) first, evenly mixing $Ni_{0.091}Co_{0.04}Al_{0.05}O_2$ oxide, lithium hydroxide, and $Mg(OH)_2$ with D50 of 2.5 μm in a high-speed mixer (Li/(Ni+Co+Al+Mg)=1.08, Mg is 5000 ppm), finally sintering the above mixture at 750° C. in an atmosphere of 95% oxygen+5% nitrogen for 12 h, and obtaining a Mg modified sintered product $Li_{1.08}Ni_{0.91}Co_{0.04}Al_{0.05}Mg_{0.02}O_2$ after crushing and sieving; and (2) mixing the above-mentioned sintered product $Li_{1.08}Ni_{0.091}Co_{0.04}Al_{0.05}Mg_{0.02}O_2$ with an aqueous solution containing 1.5 wt % $H_3PO_4$ to form a slurry with a slurry concentration of 1000 g/L (sintered product (g)/$H_3PO_4$ aqueous solution (L)), and obtaining the cathode material $LiNi_{0.91}Co_{0.04}Al_{0.05}Mg_{0.02}O_2$ after washing, filtering and drying, the cathode material having an average particle size of 13.3 μm, D95 of 23.4 μm, and a specific surface area of 1.02 m²/g.

Table 1 shows the performance test results of the cathode material prepared in this example.

Example 7

In this example, the cathode material was prepared according to the following method:

first, evenly mixing $Ni_{0.082}Co_{0.10}Al_{0.08}O_2$ oxide, $Ni_{0.82}Co_{0.10}Al_{0.08}(OH)_2$ hydroxide, lithium hydroxide, and $MnO_2$ with D50 of 30 nm in a high-speed mixer (Li/(Ni+Co+Al+Mn)=1.08, Mn is 6000 ppm), finally sintering the above mixture at 780° C. in an atmosphere of 92% oxygen+8% nitrogen for 15 h, and obtaining a Mn modified sintered product $Li_{1.08}Ni_{0.82}Co_{0.08}Mn_{0.01}O_2$ after crushing and sieving; and (2) mixing the above-mentioned sintered product $Li_{1.08}Ni_{0.82}Co_{0.10}Al_{0.08}Mn_{0.01}O_2$ with an aqueous solution containing 1.5 wt % $H_3PO_4$ to form a slurry with a slurry concentration of 650 g/L (sintered product (g)/$H_3PO_4$ aqueous solution (L)), and obtaining the cathode material $LiNi_{0.82}Co_{0.10}Al_{0.08}Mn_{0.01}O_2$ after washing, filtering and drying, the cathode material having an average particle size of 11.2 μm, D95 of 22.7 μm, and a specific surface area of 0.83 m²/g.

Table 1 shows the performance test results of the cathode material prepared in this example.

Example 8

In this example, the cathode material was prepared according to the following method:

first, evenly mixing $Ni_{0.85}Co_{0.08}Al_{0.07}O_2$ oxide, $Ni_{0.85}Co_{0.08}Al_{0.07}(OH)_2$ hydroxide, lithium hydroxide, and $Sr(OH)_2 \cdot 8H_2O$ with D50 of 2.5 μm in a high-speed mixer (Li/(Ni+Co+Al+Sr)=1.08, Sr is 3500 ppm), finally sintering the above mixture at 760° C. in an atmosphere of 93% oxygen+7% nitrogen for 15 h, and obtaining a Sr modified sintered product $Li_{1.08}Ni_{0.85}Co_{0.08}Al_{0.07}Sr_{0.004}O_2$ after crushing and sieving; and (2) mixing the above-mentioned sintered product $Li_{1.08}Ni_{0.85}Co_{0.08}Al_{0.07}Sr_{0.004}O_2$ with an aqueous solution containing 1.5 wt % $H_3PO_4$ to form a slurry with a slurry concentration of 700 g/L (sintered product (g)/$H_3PO_4$ aqueous solution (L)), and obtaining the cathode material $LiNi_{0.85}Co_{0.08}Al_{0.07}Sr_{0.004}O_2$ after washing, filtering and drying, the cathode material having an average particle size of 11.9 μm, D95 of 21.2 μm, and a specific surface area of 1.05 $m^2/g$.

Table 1 shows the performance test results of the cathode material prepared in this example.

Comparative Example 1

In this comparative example, except that $Mg(OH)_2$ was not added in step (1), all other operations and raw material ratios were the same as in Example 1.

Table 1 shows the performance test results of the cathode material prepared in this comparative example.

The scanning electron microscope pictures of the cathode material prepared in this comparative example are shown in FIG. 3a and FIG. 3b.

Comparative Example 2

In this comparative example, except that the Mg content in step (1) was increased to 2,4000 ppm, all other operations and raw material ratios were the same as in Example 1.

Table 1 shows the performance test results of the cathode material prepared in this comparative example.

Comparative Example 3

In this comparative example, except that pure water was used for washing in step (2) (without adding the non-aqueous substance), all other operations and raw material ratios were the same as in Example 1.

Table 1 shows the performance test results of the cathode material prepared in this comparative example.

Test Method

A Malvern Mastersizer 2000 laser particle size analyzer was used to test the particle size of the cathode material to obtain the particle size distribution, average particle size (D50) and D95.

A Mike Tristar3020 specific surface area and pore size analyzer was used to test the specific surface area of the cathode material. A certain mass of powder was weighed and completely degassed under vacuum heating. After the surface adsorbate was removed, the specific surface area of the particle was calculated according to the amount of nitrogen absorbed by the nitrogen adsorption method.

A scanning electron microscope was used to analyze the morphology of the cathode material, and scanning electron microscope pictures were obtained.

The electrochemical performances of the prepared cathode material were evaluated by using a coin half cell. The specific method is as follows: the cathode material, conductive carbon black Super P and polyvinylidene fluoride (PVDF) were weighed according to a mass ratio of 96:2:2, N-methyl-2-pyrrolidone (NMP) was added based on a solid content of 50%, the mixture was made into a viscous slurry by a high-speed disperser, evenly coated on an aluminum foil with a scraper, dried in an oven at 80° C., and roller pressed. The coated foil was cut into a cathode sheet with a diameter of 14 mm. A lithium sheet with a diameter of 16 mm was used as a negative electrode, a Celgard polypropylene (PP) membrane was used as a separator, and a solution of 1 mol/L LiPF6 in carbonates (diethyl carbonate (DEC)/ethylene carbonate (EC), V:V=1:1) was used as an electrolyte. The coin half cell was assembled in a glove box filled with argon.

A LAND battery test system was used to test capacity, efficiency and rate capability at 25° C. and 3.0 V-4.3 V. The reference capacity was set at 200 mA/g, and the current density corresponding to 1 C was 200 mA/g.

A potentiometric titrator was used to test the total amount of lithium compounds on the surface of the cathode material, specifically by titration with hydrochloric acid and then conversion of the amount of consumed hydrochloric acid into the amount of lithium compounds.

An ion beam cutter was used to cut the cathode material particle, and then a high-precision electron spectrometer was used to perform element line scan on the cross section of the cut particle, and then the molar ratio of M distributed in the interior of the particle to M distributed in the surface of the particle according to the line scan element distribution curve.

A NETZSCH differential scanning calorimeter was used to test the thermal stability of the electrode material in a sealed high-pressure crucible under a nitrogen atmosphere at 5° C./min to obtain a differential scanning heat curve. The electrode material was the active material scraped from the electrode sheet of a fully charged coin half-cell after cycling 2.5 cycles at 0.1 C. The results of the above performance tests are as follows:

TABLE 1

| | 0.1 C. discharge capacity mAh/g | Efficiency % | 0.5 C. discharge capacity mAh/g | 1 C. discharge capacity mAh/g | 2 C. discharge capacity mAh/g | 4 C. discharge capacity mAh/g | 6 C. discharge capacity mAh/g | Surface lithium content wt % | Molar ratio of M in the interior to M in the surface |
|---|---|---|---|---|---|---|---|---|---|
| Example 1 | 210.5 | 90.5 | 200.1 | 195.5 | 191.9 | 185.6 | 178.3 | 0.06 | 1.2 |
| Example 2 | 200.2 | 88.9 | 190.3 | 185.9 | 182.3 | 176.5 | 165.4 | 0.04 | 0.9 |
| Example 3 | 235.6 | 90.7 | 224.2 | 217.3 | 212.5 | 205.8 | 199.6 | 0.07 | 0.7 |
| Example 4 | 209.4 | 90.2 | 194.0 | 189.9 | 186.4 | 180.9 | 170.8 | 0.06 | 1.3 |
| Example 5 | 214.4 | 90.5 | 202.1 | 195.9 | 191.6 | 184.3 | 177.9 | 0.05 | 1.0 |
| Example 6 | 215.3 | 90.2 | 203.4 | 196.7 | 192.1 | 184.8 | 178.2 | 0.07 | 1.5 |
| Example 7 | 206.4 | 90.0 | 195.2 | 190.6 | 187.2 | 181.9 | 173.8 | 0.06 | 1.1 |
| Example 8 | 207.3 | 89.9 | 194.7 | 189.5 | 186.3 | 180.1 | 172.4 | 0.05 | 1.4 |

TABLE 1-continued

| | 0.1 C. discharge capacity mAh/g | Efficiency % | 0.5 C. discharge capacity mAh/g | 1 C. discharge capacity mAh/g | 2 C. discharge capacity mAh/g | 4 C. discharge capacity mAh/g | 6 C. discharge capacity mAh/g | Surface lithium content wt % | Molar ratio of M in the interior to M in the surface |
|---|---|---|---|---|---|---|---|---|---|
| Comparative example 1 | 205.3 | 89.2 | 191.3 | 185.6 | 181.2 | 168.6 | 155.3 | 0.09 | / |
| Comparative example 2 | 198.5 | 88.3 | 176.7 | 166.5 | 157.1 | 137.1 | 116.1 | 0.07 | 0.4 |
| Comparative example 3 | 208.5 | 89.8 | 193.0 | 189.5 | 185.5 | 178.2 | 169.7 | 0.10 | 1.1 |

It can be seen from FIG. 2a and FIG. 2b that the cathode material obtained in Example 1 has no obvious large grains on the surface of the particle, indicating that the Mg or/and Mg compound and the nickel-rich ternary cathode material are efficiently blended together, that is, Mg is successfully doped in the interior of the particle and evenly coated in the surface.

It can be seen from the rate capability of FIG. 4 that the rate capability of the cathode material obtained in Example 1 is better than that of Comparative Example 1, indicating that the rate capability of the cathode material prepared without adding the M compound is significantly worsened.

It can be seen from the differential scanning heat curve of FIG. 5 that the decomposition temperature and heat release of the cathode material corresponding to Example 1 are better than those of Comparative Example 1, indicating that the thermal stability of the cathode material prepared without adding the M compound is significantly worsened.

It can be seen from Table 1 that the electrochemical performances of the cathode materials prepared in the examples of the present application are all relatively better, the 0.1 C discharge capacity is 200 mAh/g or greater, the efficiency can reach about 90%, the rate capability is good, and the lithium content of the surface is low.

The comparison of the data of Example 1 and Comparative Example 1 in Table 1 shows that the cathode material prepared without the addition of Mg(OH)$_2$ has a significantly worse rate capability.

The comparison of the data of Example 1 and Comparative Example 2 in Table 1 shows that when the Mg content increases to 2,4000 ppm, that is, when the M content is too high, the molar ratio of M distributed in the interior to M distributed in the surface is much smaller than 0.5, which increases the internal resistance of the cathode material, leading to a decrease in the capacity and rate capability of the material.

The comparison of the data of Example 1 and Comparative Example 3 in Table 1 shows that when the non-aqueous substance is not added in the washing process, excessively much lattice lithium is lost during the washing process, which damages the surface structure, and meanwhile, no high lithium ion conductor coating layer is formed during the washing process. Based on the above two reasons, the rate capability of the obtained cathode material decreases, and the lithium content of the surface also increases.

The applicant declares that the present application uses the above-mentioned examples to illustrate the detailed process equipment and process flow of the present application, but the present application is not limited to the above-mentioned detailed process devices and process flow, that is, the implementation of the present application does not necessarily rely on the above-mentioned detailed process devices and process flow. Those skilled in the art should understand that any improvements to the present application, equivalent replacements of respective raw materials of the product of the present application, the addition of auxiliary components, the selection of specific methods, etc., fall within the protection scope and disclosure of the present application.

What is claimed is:

1. A cathode material, wherein a chemical formula of the cathode material is $Li_bNi_{1-x-y}Co_xAl_yM_zO_2$, where $0.95 \leq b \leq 1.10$, $0 \leq x \leq 0.15$, $0.01 \leq y \leq 0.1$, $0 < z \leq 0.05$, and an M element is a metal element;

the M element is distributed in interior and surface of the cathode material, the M element distributed in the interior of the cathode material is presented in a doped form, and the M element distributed in the surface of the cathode material is presented in a form of a coating layer formed of at least one of M oxide or lithium-M composite oxide, wherein when performing element line scan by a high-precision electron spectrometer along an approximate diameter direction in a cross-section of a particle of the cathode material cut by an ion beam cutter, the surface is defined as at an end of the diameter of the line analysis, and the interior is defined as at a center of the diameter;

a molar ratio of the M element in the interior to the M element in the surface is greater than 0.5 and less than 1.5.

2. The cathode material according to claim 1, wherein the cathode material satisfies at least one of the following conditions a to d:

a. the M element is selected from the group consisting of Al, Mn, Mg, Sr, Ca, Zr, Ti, La, W, Nb, Y, Gd, and combinations thereof;

b. a total content of the M element in the cathode material is in a range from 500 ppm to 5000 ppm;

c. lithium content in the surface of the cathode material is 0.02 mass % to 0.12 mass % of a total mass of the cathode material; and d. a carbon content in the surface of the cathode material is 0.01 mass % to 0.035 mass % of the total mass of the cathode material.

3. The cathode material according to claim 1, wherein the cathode material satisfies at least one of the following conditions a to f:

a. the cathode material is a secondary particle composed of primary particles, and the secondary particle has an internally dense structure;

b. a particle of the cathode material is spherical or quasi-spherical;

c. an average particle size of the cathode material is in a range from 3 μm to 20 μm;

d. D95 of the cathode material is greater than 20 μm;

e. a specific surface area of the cathode material is in a range from 0.5 m²/g to 2.0 m²/g; and f. an initial discharge capacity of the cathode material in a 2032 coin cell is greater than or equal to 200 mAh/g.

4. The cathode material according to claim 2, wherein the cathode material satisfies at least one of the following conditions a to f:

a. the cathode material is a secondary particle composed of primary particles, and the secondary particle has an internally dense structure;

b. a particle of the cathode material is spherical or quasi-spherical;

c. an average particle size of the cathode material is in a range from 3 μm to 20 μm;

d. D95 of the cathode material is greater than 20 μm;

e. a specific surface area of the cathode material is in a range from 0.5 m²/g to 2.0 m²/g; and f. an initial discharge capacity of the cathode material in a 2032 coin cell is greater than or equal to 200 mAh/g.

5. A secondary lithium battery, comprising a cathode material represented by a chemical formula of $Li_bNi_{1-x-y}Co_xAl_yM_zO_2$, where $0.95 \leq b \leq 1.10$, $0 \leq x \leq 0.15$, $0.01 \leq y \leq 0.1$, $0 < z \leq 0.05$, and an M element is a metal element;

the M element is distributed in interior and surface of the cathode material, the M element distributed in the interior of the cathode material is presented in a doped form, and the M element distributed in the surface of the cathode material is presented in a form of a coating layer formed of at least one of M oxide or lithium-M composite oxide, wherein when performing element line scan by a high-precision electron spectrometer along an approximate diameter direction in a cross-section of a particle of the cathode material cut by an ion beam cutter, the surface is defined as at an end of the diameter of the line analysis, and the interior is defined as at a center of the diameter;

a molar ratio of the M element in the interior to the M element in the surface is greater than 0.5 and less than 1.5.

6. A cathode material, wherein a chemical formula of the cathode material is $Li_bNi_{1-x-y}Co_xAl_yM_zO_2$, where $0.95 \leq b \leq 1.10$, $0 \leq x \leq 0.15$, $0.01 \leq y \leq 0.1$, $0 < z \leq 0.05$, and an M element is a metal element;

the M element is distributed in interior and surface of the cathode material, the M element distributed in the interior of the cathode material is presented in a doped form, and the M element distributed in the surface of the cathode material is presented in a form of a coating layer formed of at least one of M oxide or lithium-M composite oxide;

a molar ratio of the M element in the interior to the M element in the surface is greater than 0.5 and less than 1.5.

7. The cathode material according to claim 6, wherein the cathode material satisfies at least one of the following conditions a to d:

a. the M element is selected from the group consisting of Al, Mn, Mg, Sr, Ca, Zr, Ti, La, W, Nb, Y, Gd, and combinations thereof;

b. a total content of the M element in the cathode material is in a range from 500 ppm to 5000 ppm;

c. lithium content in the surface of the cathode material is 0.02 mass % to 0.12 mass % of a total mass of the cathode material; and d. a carbon content in the surface of the cathode material is 0.01 mass % to 0.035 mass % of the total mass of the cathode material.

8. The cathode material according to claim 7, wherein the cathode material satisfies at least one of the following conditions a to f:

a. the cathode material is a secondary particle composed of primary particles, and the secondary particle has an internally dense structure;

b. a particle of the cathode material is spherical or quasi-spherical;

c. an average particle size of the cathode material is in a range from 3 μm to 20 μm;

d. D95 of the cathode material is greater than 20 μm;

e. a specific surface area of the cathode material is in a range from 0.5 m²/g to 2.0 m²/g; and f. an initial discharge capacity of the cathode material in a 2032 coin cell is greater than or equal to 200 mAh/g.

9. The cathode material according to claim 6, wherein the cathode material satisfies at least one of the following conditions a to f:

a. the cathode material is a secondary particle composed of primary particles, and the secondary particle has an internally dense structure;

b. a particle of the cathode material is spherical or quasi-spherical;

c. an average particle size of the cathode material is in a range from 3 μm to 20 μm;

d. D95 of the cathode material is greater than 20 μm;

e. a specific surface area of the cathode material is in a range from 0.5 m²/g to 2.0 m²/g; and f. an initial discharge capacity of the cathode material in a 2032 coin cell is greater than or equal to 200 mAh/g.

* * * * *